United States Patent Office 2,953,565
Patented Sept. 20, 1960

2,953,565
PYRIMIDYL, IMIDAZOLYL AND DIAZEPINYL ACETALS AND GLYCOLATES

John A. Faust and Melville Sahyun, Santa Barbara, Calif., assignors to Melville Sahyun, doing business as Sahyun Laboratories, Santa Barbara, Calif.

No Drawing. Filed Dec. 13, 1956, Ser. No. 628,012

12 Claims. (Cl. 260—251)

This invention relates to organic amino esters and is more particularly concerned with esters containing arylated acid and heterocyclic alcohol moieties, and acid addition salts thereof, and processes for their preparation.

The invention resides in the concept of a composition of matter having a molecular structure wherein an ester is formed from a substituted-acetic acid moiety and an alcohol moiety based on a dihydroimidazolyl, tetrahydrodiazepinyl or tetrahydropyrimidyl ring which may be substituted and acid addition salts thereof. The physical embodiments of this inventive concept exhibit applied use characteristics in that they possess antispasmodic and other pharmaco-dynamic activities.

The compounds of the present inventions are monocyclic saturated amidine esters of beta-polysubstituted-lower-aliphatic acids and their acid addition salts. The acid moiety must have at least two substituents, other than hydrogen, on the alpha carbon atom. One of these required substituents is an aryl or S-heterocarbocyclic group; the other is an aryl, lower-alkyl or cycloalkyl group. If there is a third substitutent, it will be hydroxyl, lower-alkoxy or halogen. Among the molecular structures representative of the invention are those having the following formula:

$$R_1-\underset{\underset{R_2}{|}}{\overset{\overset{R}{|}}{C}}-\overset{O}{\overset{||}{C}}-O-\overset{\overset{R_3}{|}}{C}H-C\underset{\underset{R_4}{|}}{\overset{N}{\diagdown}}\overset{R_5}{\underset{R_6}{\diagdown}}(CH_2)_n$$

wherein:
R is aryl or S-heterocarbocyclic;
$R_1$ is hydrogen, hydroxyl, lower-alkoxy, or halogen;
$R_2$ is aryl, lower-alkyl, or cycloalkyl;
$R_3$ is hydrogen, or lower-alkyl;
$R_4$ is hydrogen, lower-alkyl, or benzyl;
$R_5$ and $R_6$ are each hydrogen or methyl;
$n$ is the integer 2, 3, or 4; and the stable, non-toxic acid addition salts thereof.

Representative of some of the types of molecular configurations included within the alcohol moiety of the inventive ester concept are such radicals as:

$-CH_2-C\underset{\underset{H}{|}}{\overset{N-CH_2}{\diagup}}\diagdown_{N-CH_2}$ 2-(4,5-dihydroimidazolyl)methyl $-CH_2-C\underset{NH-CH_2}{\overset{N=CH}{\diagup}}\overset{CH_3}{|}$ 2-(4-methyl-4,5-dihydroimidazolyl)methyl $-CH_2-C\underset{\underset{H}{|}}{\overset{N-CH_2}{\diagup}}\diagdown_{CH_2}^{N-CH_2}$ 2-(1,4,5,6-tetrahydropyrimidyl)methyl $-CH_2-C\underset{NH-CH_2}{\overset{N-CH}{\diagup}}\overset{CH_3}{|}\diagdown_{CH_2}$ 2-(4-methyl-1,4,5,6,-tetrahydropyrimidyl)methyl $-CH_2-C\underset{\underset{CH_3}{|}}{\overset{N-CH_2}{\diagup}}\diagdown_{N-CH_2}^{CH_2}$ 2-(1-methyl-1,4,5,6-tetrahydropyrimidyl)methyl $-CH_2-C\underset{\underset{CH_3}{|}}{\overset{N-CH}{\diagup}}\overset{CH_3}{|}\diagdown_{CH_2}^{N-CH_2}$ 2-(1,4-dimethyl-1,4,5,6-tetrahydropyrimidyl)methyl $-CH_2-C\underset{\underset{CH_3}{|}}{\overset{N-CH_2}{\diagup}}\overset{CH_3}{\underset{CH_3}{\diagdown C}}\diagdown_{N-CH_2}$ 2-(1,5,5-trimethyl-1,4,5,6-tetrahydropyrimidyl)methyl $-CH_2-C\underset{\underset{CH_2-\phi}{|}}{\overset{N-CH_2}{\diagup}}\diagdown_{N-CH_2}^{CH_2}$ 2-(1-benzyl-1,4,5,6-tetrahydropyrimidyl)methyl $-CH_2-C\underset{NH-CH_2}{\overset{N-CH_2}{\diagup}}\diagdown_{CHOH}$ 2-(5-hydroxy-1,4,5,6-tetrahydropyrimidyl)methyl $-\underset{\underset{C_2H_5}{|}}{C}H-C\underset{NH-CH_2}{\overset{N-CH_2}{\diagup}}\diagdown_{CH_2}$ 2-(1,4,5,6-tetrahydropyrimidyl)-n-propyl Representatives of some of the types of molecular configurations included within the acid moiety of the inventive ester concept are such radicals as:

H—C(Ph)(C₆H₁₁S)—COO— alpha-cyclohexylphenylacetate

HO—C(Ph)(C₆H₁₁S)—COO— alpha-cyclohexylphenylglycolate

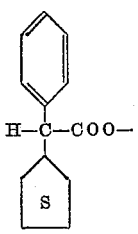

alpha-cyclopentylphenylacetate

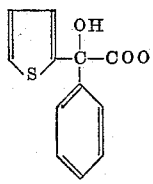

alpha-Phenyl-2-thienylglycolate

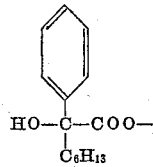

alpha-Hexylphenylglycolate

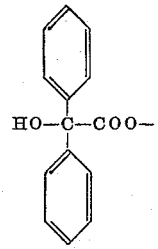

Benzilate

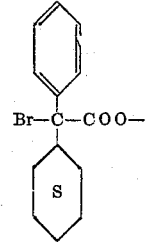

alpha-Bromo-alpha-cyclohexylphenylacetate

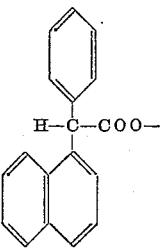

alpha-naphthyl-alpha-phenylacetate

The compounds of the present invention are readily prepared by the contact interaction, preferably in the presence of potassium iodide, of the halide of the desired alcohol moiety,

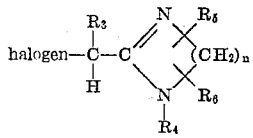

where the substituents are as previously identified and the halogen is iodine, bromine or preferably (because of ease of preparation and availability) chlorine, with the acid of the desired acid moiety,

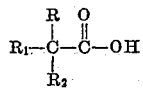

where the substituents are as previously identified.

Representative acids which are suitable include, for example, benzilic acid, alpha-phenyl-alpha-cyclopentyl acetic acid, alpha - phenyl - alpha - cyclohexyl-hydroxyacetic acid, alpha - naphthyl - alpha-phenylacetic acid, dinaphthylacetic acid, diphenylacetic acid, dinaphthylhydroxyacetic acid, alpha-phenyl-caproic acid, alpha-phenyl-alpha-hydroxycaproic acid, alpha-phenyl-alpha-methoxyacetic acid, alpha-naphthyl-alpha-propoxybutyric acid, et cetera, that is, wherein R in the above formula may be phenyl, tolyl, naphthyl, hydroxyphenyl, halonaphthyl, xenyl, 2-thienyl, et cetera; $R_1$ may be hydrogen, hydroxyl, chlorine, bromine, iodine, methoxy, ethoxy, propoxy, butoxy, et cetera, and wherein $R_2$ when aryl may be tolyl, phenyl, naphthyl, halonaphthyl, xenyl, hydroxynaphthyl, et cetera, when alkyl may be methyl, ethyl, propyl, butyl, isobutyl, octyl, heptyl, et cetera, and when cycloakyl may be cyclopentyl, cyclohexyl, cycloheptyl, et cetera. There may be non-functional substituents on the ring and alkyl groups, providing the substituents do not adversely affect the pharmacologic effect of the final molecule.

The reaction is preferably counducted in the presence of an iodide salt, e.g. potassium iodide, as reaction initiator and catalyst and usually in the presence of a solvent. Representative solvents which are suitable include, for example, methanol, ethanol, isopropanol, propanol, butanol, acetone, et cetera. Contact of the reactants and potassium iodide is ordinarily sufficient to initiate reaction. Temperatures above about fifty degrees centigrade are preferred, in order to decrease the reaction time. When temperatures on the order of reflux temperatures of the reaction mixture are used, the reaction can ordinarily be completed in from four to ten hours. After completion of the reaction, the reaction mixture is filtered to remove the solides formed therein, or, ether may be added to precipitate the solid. This solid will be the acid addition salt corresponding to the halogen of the starting material employed, and may be separated by filtration, centrifugation, or decantation, and recrystallized from an appropriate solvent. Separation of the free esters of the present invention is readily accomplished by dissolving an acid addition salt in a suitable solvent, neutralizing this solvent with an alkaline material such as, for example, sodium hydroxide, potassium hydroxide, et cetera, and extracting the resulting mixture with ether, in the event that the free ester does not precipitate, the ether is then removed, to leave a free ester which is normally a high boiling liquid or a low melting solid.

Acid addition salts, such as, for example, the hydrochloride, hydrobromide, hydroiodide, acetate, nitrate, sulfate, lactate, citrate, phosphate, bitartrate, para-toluenesulfonate, et cetera, may be readily prepared by contacting a solvent solution of the free ester with a solvent solution of the appropriate salt-forming reagent. Upon contact, the salt will normally precipitate, if a proper selection of solvents has been made, or the solvent can be removed by distillation to leave the acid addition salt.

Certain of the compounds of the present invention may be prepared from an ester containing all the other requirements of the compounds of the present invention except the lower-alkyl substituent on the alcohol moiety. If the lower-alkyl substituent is desired on the non-double-bonded nitrogen, this is readily accomplished by the interaction with a lower-alkyl halide of the corresponding non-substituted ester. Some of the esters which are suitable include, for example, 2-(1,4,5,6-tetrahydropyrimidyl)methyl alpha-cyclohexyl-alpha-phenylacetate hydrochloride (alternate terminology for which is 1,4, 5,6-tetrahydro-2-pyrimidylmethyl alpha-cyclohexyl-alpha-phenylacetate hydrochloride), 2-(4,5-dihydroimidazolyl) methyl alpha-cyclohexyl-alpha-phenylglycolate hydrochloride, 2-(1,4,5,6 - tetrahydropyrimidyl)-methyl 1-phenyl-1-hydroxycaproate hydrochloride, 2-(1,4,5,6-tetrahydropyrimidyl)methyl benzilate hydrochloride, 2-(1,4,5,6-tetrahydropyrimidyl)methyl diphenylacetate hydrochloride, 2-(1,4,5,6-tetrahydropyrimidyl)methyl phenyl-2-thienylglycolate hydrochloride, 2-(4,5-dihydroimidazolyl) diphenylacetate hydrochloride, et cetera. Separation of the free ester is accomplished in the manner described hereinabove, and this free ester contacted, in the presence of a solvent, with an alkyl halide. Representative lower-alkyl halides which are suitable include, for example, methyl bromide, ethyl chloride, propyl iodide, hexyl iodide, et cetera. The reaction is usually conducted in the presence of a solvent in which both reactants are soluble and in which the product is insoluble. Solvents which are suitable include, for example, isopropanol, propanol, ethanol, chloroform, et cetera. Separation and recovery of the product may be accomplished in conventional manner.

The following preparations are illustrative of certain of the intermediates used in preparing the compounds of the present invention, and of processes for the preparation of such types of intermediates, but are not to be construed as limiting:

PREPARATION 1.—2 - CHLOROMETHYL - 1,4,5,6-TETRAHYDROPYRIMIDINE HYDROCHLORIDE

A stirred solution of 7.5 grams (0.1 mole) of 1,3-diaminopropane in ninety milliliters of ethanol was cooled to zero degrees centigrade and 15.8 grams (0.1 mole) of ethyl chloroimidoacetate hydrochloride was added in portions during the course of one hour. After the mixture was stirred for two hours at zero degrees centigrade, it was acidified by the addition of 68 milliliters of two normal ethanolic hydrogen chloride, keeping the temperature at zero to five degrees centigrade. The mixture was allowed to warm to twenty degrees centigrade, and stirred for one hour, after which it was filtered. The filtrate was vacuum-distilled to a solid residue which was recrystallized from 25 milliliters of isopropanol. The yield of 2-chloromethyl-1,4,5,6-tetrahydropyrimidine hydrochloride, as a crystalline solid melting at 202–207 degrees centigrade, was 8 grams (47 percent of the theoretical yield).

PREPARATION 2.—2 - CHLOROMETHYL - 4 - METHYL - 1,4,5,6 - TETRAHYDROPYRIMIDE HYDROCHLORIDE

To a stirred solution of 8.8 grams (0.1 mole) of 1,3-diaminobutane in 150 milliliters of ethanol maintained at 0–5 degrees centigrade, there was added 15.8 grams (0.1 mole) of ethyl chlorimidoacetate hydrochloride during a period of 20 minutes. After the mixture had been stirred at 0–5 degrees centigrade for two hours, it was acidified at this temperature by the addition of ethanolic hydrogen chloride.

*Analysis.*—Calculated for $C_5H_9ClN_2 \cdot HCl$: N 16.57. Found: N 16.46.

The mixture was warmed to room temperature and filtered to remove 4.3 grams of solid ammonium chloride. The filtrate was concentrated to approximately 40 milliliters, filtered and refrigerated. The solid which separated was isolated, washed with acetone and dried. There was obtained 7.4 grams (40 percent of the theoretical yield) of 2-chloro-methyl-4-methyl-1,4,5,6-tetrahydropyrimidine hydrochloride, melting at 158–160 degrees centigrade. A sample for analysis, melting at 173–174 degrees centigrade, was obtained by liberating the base, converting the base into the hydrochloride salt and recrystallizing the salt from alcohol-ether. The mother liquor was concentrated to an oil (8 grams) which partially solidified to a slush, and is sufficiently pure for use in subsequent esterifications.

*Analysis.*—Calculated for $C_6H_{11}ClN_2 \cdot HCl$: N, 15.30. Found: N, 15.15.

PREPARATION 3.—2 - CHLOROMETHYL - 4 - METHYL-1,4,5,6-TETRAHYDROPYRIMIDINE

A solution of 6.3 grams (0.034 mole) of the corresponding hydrochloride (from Preparation 2 above) in 15 milliliters of water was made alkaline with 15 milliliters of 40 percent sodium hydroxide and the mixture was thoroughly extracted with ether. The ether solution was dried over anhydrous calcium sulfate and the ether was removed. There was thus obtained 5 grams of 2-chloromethyl-4-methyl-1,4,5,6-tetrahydropyrimidine as a clear, yellow oil.

PREPARATION 4.—BETA-METHYLAMINOPROPIONITRILE

A solution of 53 grams (1 mole) of acrylonitrile in 75 milliliters of ethanol was added dropwise to a stirred solution of 43 grams (1.3 moles) of ethylamine in 500 milliliters of ethanol maintained at 0–10 degrees centigrade. The homogeneous solution was stirred at 10–20 degrees centigrade for one hour, and then allowed to remain at room temperature for 3 hours. The solution was fractionated and the fraction boiling at 81–82 degrees centigrade at 20 milliliters of mercury pressure absolute was collected. The yield was 64 grams (76 percent of the theoretrical yield) of beta-methylaminopropionitrile. Reported boiling point 101–104 degrees at 49 millimeters of mercury absolute. J. Am. Chem. Soc. 68, 1217, (1946).

PREPARATION 5.—N.-METHYL-1,3-DIAMINOPROPANE HYDROCHLORIDE

A solution of 40 grams (0.48 mole) of beta-methylaminoproprionitrile in 100 milliliters of dry ether was added dropwise over a period of 2 hours to a stirred mixture of 27.4 grams (0.72 mole) of lithium aluminum hydride in 1500 milliliters of dry ether at room temperature. The mixture was stirred at room temperature for 18 hours after which it was cooled, and sufficient 40 percent sodium hydroxide was added to convert the inorganic salts to a white sludge. The ether was decanted from the sludge, and the sludge was extracted with fresh ether. Acidification of the combined ether solutions with excess ethereal hydrogen chloride precipitated 46 grams (58 percent of the theoretical yield) of N-methyl-1,3-diaminopropane hydrochloride, a crystalline solid melting at 189-191 degrees centigrade, after recrystallization from methanol-ether.

*Analysis.*—Calculated for $C_4H_{12}N_2 \cdot 2CHCl$: N, 17.39. Found: N, 17.16.

The boiling point of the anhydrous free base is reported as 138–141 degrees centigrade (J. Am. Chem. Soc., 68, 1217 (1946).

PREPARATION 6.—2-HYDROXYMETHYL-1-METHYL-1,4,5,6-TETRAHYDROPYRIMIDINE HYDROCHLORIDE

To a stirred solution of 30 grams (0.34 mole) of N.-methyl-1,3-diaminopropane in 300 milliliters of ethanol maintained at 0–10 degrees centigrade there was added 47 grams (0.34 mole) of ethyl glycolimidate hydrochloride over a period of 2 hours. The mixture was stirred at ice-bath temperature for two hours and then at room temperature for two hours. The mixture was thereafter vacuum distilled to remove most of the ammonia, acidified with ethanolic hydrogen chloride and filtered. The filtrate was concentrated to a small volume, filtered and diluted with ether to precipitate the crystalline product. A second crop was obtained from the mother liquor by further dilution with ether. There was thus obtained 34 grams (60 percent of the theoretical yield) of 2-hydroxymethyl-1-methyl-1,4,5,6-tetrahydropyrimidine hydrochloride melting at 144–149 degrees centigrade. Repeated crystallization from alcohol-ether raised the melting point to 164–165 degrees centigrade.

PREPARATION 7.—2 - CHLOROMETHYL - 1 - METHYL - 1,4,5,6 - TETRAHYDROPYRIMIDINE HYDROCHLORIDE

Three grams of 2-hydroxymethyl-1-methyl-1,4,5,6-tetrahydropyrimidine hydrochloride were added in small portions to 10 milliliters of thionyl chloride containing one drop of pyridine at room temperature. The solid dissolved almost immediately, and the solution was warmed at 45–50 degrees centigrade for one hour, after which it was vacuum distilled from a 50 degrees centigrade bath. The residual oil was dissolved in isopropanol, the solution was charcoaled and filtered and the filtrate was vacuum distilled at about 50 degrees centigrade to remove the solvent. The residue, 2-chloromethyl-1-methyl-1,4,5,6-tetrahydropyrimidine hydrochloride, was a clear, pale amber oil and was used as such.

PREPARATION 8.—ALPHA-CYCLOPENTYL-PHENYLGLYCOLIC ACID

A Grignard reagent, prepared from 4.8 grams (0.2 mole) of magnesium, 29.8 grams (0.2 mole) of cyclopentyl bromide and 150 milliliters of ether, was stirred at 0–5 degrees centigrade and treated dropwise with a solution of 13 grams (0.09 mole) of benzoyl formic acid in 125 milliliters of benzene. After the mixture had been stirred for an additional hour at ice-bath temperature, it was allowed to remain at room temperature overnight. Dilute hydrochloric acid was added and the mixture was stirred until two clear layers were obtained. The ether layer was separated and the ether removed. The residue was dissolved in dilute sodium carbonate solution, the solution filtered and acidified to precipitate the solid acid which was recrystallized from acetic acid. There was thus obtained 5.1 grams (27 percent of the theoretical yield) of alpha-cyclopentylphenylglycolic acid melting at 148–149 degrees centigrade.

*Analysis.*—Calculated: for $C_{13}H_{16}O_3$ Neut. Equiv. 215.3. Found: 213.5.

PREPARATION 9.—2-HYDROXYMETHYL-4-METHYLIMIDAZOLINE HYDROCHLORIDE

A stirred solution of 44.0 grams (0.5 mole) of 1,2-diaminopropane in 500 milliliters of ethanol was cooled to 0–5 degrees centigrade and treated portion-wise during a 15 minutes period with 69.8 grams (0.5 mole) of ethyl glycolimidate hydrochloride. The mixture was stirred at 0–10 degrees centigrade for two hours, at room temperature for an hour, and then vacuum distilled at a low temperature to remove most of the ammonia which had formed during the reaction. The mixture was then acidified with alcoholic hydrogen chloride, warmed, and filtered to remove the insoluble material. The filtrate was vacuum distilled to 59 grams (78 percent of the theoretical yield) of an oil residue, 2-hydroxymethyl-4-methylimidazoline hydrochloride. This oil resisted crystallization and was used as such in the subsequent step.

PREPARATION 10.—2-CHLOROMETHYL-4-METHYLIMIDAZOLINE HYDROCHLORIDE

To a cooled solution of 59 grams (0.39 mole) of 2-hydroxymethyl-4-methylimidazoline hydrochloride in 150 milliliters of chloroform there was added, slowly and with shaking, 70 milliliters (0.94 mole) of thionyl chloride. After the mixture had refluxed for five hours, the solvent was removed by vacuum distillation and the residual oil was dissolved in ethanol. The solution was treated with charcoal, filtered, diluted with ether and allowed to remain at room temperature. After four days, the solid was isolated and a second crop of crystals was thus obtained by further dilution of the mother liquor with ether. There was thus obtained 16.5 grams (25 percent of the theoretical yield) of 2-chloromethyl-4-methylimidazoline hydrochloride melting at 148–149 degrees centigrade after recrystallization from ethanol-ether.

*Analysis.*—Calculated for $C_5H_9N_2.HCl$: N, 16.57. Found: N, 16.41.

PREPARATION 11.—ALPHA-HEXYLPHENYLGLYCOLIC ACID

A Grignard reagent prepared from 66.0 grams (0.4 mole) of n-hexylbromide, 9.6 grams (0.4 mole) of magnesium and 300 milliliters of dry ether was added to a stirred solution of 24.0 grams (0.16 mole) of benzoylformic acid in 200 milliliters of benzene at 0–5 degrees centigrade over a period of one hour. The mixture was stirred for an additional hour at ice-bath temperature and for one-half hour at room temperature. The mixture was hydrolyzed with 50 milliliters of dilute hydrochloric acid (conc. HCl:water 1:1), the stirring being continued until two clear phases resulted. The organic layer was separated, washed with 25 milliliters of water, concentrated to 100 milliliters, and extracted with two 30 milliliters of 20 percent sodium carbonate solution. On acidification of the aqueous extract at 0–10 degrees centigrade, an oil was obtained which solidified when the volatile organic solvents were removed by gentle heating. Recrystallization of the solid from heptane yielded 20.2 grams (53 percent) of the acid melting at 97–98 degrees centigrade.

*Analysis.*—Calculated for $C_{14}H_{20}O_3$: Neut. Equiv. 236.3. Found: Neut. Equiv. 238.

PREPARATION 12.—2-HYDROXYMETHYL-1,4,5,6-TETRAHYDROPYRIMIDINE HYDROCHLORIDE

A stream of hydrogen chloride was bubbled slowly through a solution of 57.1 grams (1 mole) of glycolonitrile in a mixture of 61 milliliters (1.05 moles) of anhydrous ethanol and 175 milliliters of dry chloroform cooled in an ice bath. After about 25 grams of hydrogen chloride had been absorbed, the reaction mixture set to a solid mass of crystals. The mixture was filtered, the solid was washed with a little chloroform and thereafter dried. The filtrate and wash were again treated with hydrogen chloride and the solid (27 grams) which separated, was isolated and dried. There was thus obtained 120 grams (86 percent of the theoretical yield) of a solid, probably ethyl glycolimidate hydrochloride which decomposes at about 109 degrees.

A part of this solid (70 grams; 0.5 mole) was added in portions to a stirred solution of forty grams (0.54 mole) of 1,3-diaminopropane in 400 milliliters of ethanol maintained in 0–5 degrees centigrade. The suspension was stirred at about 5–10 degrees centigrade for two hours, and the resulting homogeneous solution distilled until about 250 milliliters of distillate had been collected. The hot residual solution was acidified with approximately thirty milliliters of 6.5 Normal ethanolic hydrogen chloride and filtered to remove nine grams of solid. The filtrate was concentrated to about 200 milliliters, refrigerated, and the solid which separated was isolated. It weighed 40 grams (53 percent of the theoretical yield) and a sample, recrystallized from ethanol, was obtained as hard, sugar-like granules which are quite hygroscopic. 2-hydroxymethyl-1,4,5,6-tetrahydropyrimidine hydrochloride has a melting point of 100–102 degrees centigrade in a closed tube. Removal of the alcohol from the mother liquor left 26 grams of a brown oil which was shown to be usable material by its conversion by thionyl chloride to the chloromethyl compound in 65 percent yield. Thus, the total yield was 66 grams (88 percent of the theoretical).

*Analysis.*—Calculated for $C_5H_{11}ClN_{20}$: N, 18.6. Found: N, 17.8.

PREPARATION 13.—2-CHLOROMETHYL - 1,4,5,5-TETRAHYDROPYRIMIDINE HYDROCHLORIDE

Thionyl chloride (119 grams; 1 mole) was added to 37.5 grams (0.25 mole) of 2-hydroxymethyl-1,4,5,6-tetrahydropyrimidine hydrochloride at room temperature. There was a slight exothermic reaction at the end of which the reaction mixture was apparently homogeneous. It was refluxed for two hours and stripped of volatiles by vacuum distillation. The residual solid was recrystallized from 100 milliliters of ethanol in which it was charcoaled. A second crop of crystals was obtained by concentration of the mother liquor. Total yield of 2-chloromethyl-1,4,5,6-tetrahydropyrimidine hydrochloride was 36.5 grams (86 percent of the theoretical yield), melting at 224–225 degrees centigrade with decomposition.

*Analysis.*—Calculated for $C_5H_{10}Cl_2N_2$: N, 16.57. Found: N, 16.53.

PREPARATION 14.—2-CHOLOROMETHYL - 1,4,5,6-TETRAHYDROPYRIMIDINE

The product of Preparation 13 above (6.8 grams; 0.04 mole) in ten milliliters of water was mixed with five milliliters of fifty percent sodium hydroxide. The solution remained clear for a moment, then the base separated as a white solid which was isolated by filtration and dried in a vacuum over phosphorus pentoxide. There was thus obtained 4.7 grams (89 percent of the theoretical yield) of 2-chloromethyl-1,4,5,6-tetrahydropyrimidine, melting at 85–86 degrees centigrade with decomposition. This material decomposes after a few hours at room temperature.

PREPARATION 15.—N-BENZYLMETHYLAMINO-METHYL ISOBUTYRALDEHYDE

A mixture of 143 grams (0.9 mole) of benzylmethylamine hydrochloride, 65 grams (0.9 mole) of isobutyraldehyde, 60 grams (2 moles) of paraformaldehyde and 400 milliliters of isopropyl alcohol was refluxed for eight hours. The alcohol was removed by distillation, the residue was dissolved in water and the solution was made strongly alkaline. The insoluble oil was extracted with ether, and the dried ether solution was fractionated to yield 135 grams (73 percent) of product boiling at 142–147 degrees centigrade (16 millimeters). On redistillation it boiled at 144–146 degrees centigrade (16 millimeters).

*Analysis.*—Calculated for $C_{13}H_{19}NO$: Neut. Equiv., 205. Found: Neut. Equiv., 208.

PREPARATION 16.—N-BENZYLMETHYLAMINO-METHYL ISOBUTYRALDEHYDE OXIME

A solution of 68 grams (0.33 mole) of the amine-aldehyde of Preparation 15 in 100 milliliters of isopropyl alcohol was combined with a solution of 23 grams (0.33 mole) of hydroxylamine hydrochloride in 30 milliliters of water. The warm solution was allowed to remain at room temperature for an hour and was then distilled to remove most of the alcohol. The residual solution was made alkaline, the oily base was extracted with ether, and the dried ether solution was fractionated. Yield, 69 grams (95 percent); boiling point 143–147 degrees centigrade (2 millimeters). On redistillation it boiled at 145–147 degrees centigrade (2 millimeters).

*Analysis.*—Calculated for $C_{13}H_{20}N_2O$: Neut. Equiv., 220. Found: Neut. Equiv., 218.

PREPARATION 17.—N - BENZYLMETHYL-1,3-DIAMINO-2,2-DIMETHYLPROPANE

Sodium, 161 grams (7 grams at.), was added to a refluxing, stirred solution of 147 grams (0.67 mole) of the oxime of Preparation 16, in 1.6 liters of ethanol over a period of one hour. After all the sodium had reacted, a liter of water was added and the solution was distilled to a volume of approximately one liter. The oil which had separated was extracted with ether, the ether solution was dried and distilled. The fraction boiling at 90–155 degrees centigrade (1.5 millimeters) weighed 86.5 grams, and was redistilled through a 6 inch Vigreux-type column. Two fractions were obtained: (*a*) 47 grams; boiling point 118–121 (2 millimeters) and (*b*) 24 grams, boiling point 122–127 degrees centigrade (2–2.5 millimeters). A sample of fraction (*a*) was refractionated and only a small middle cut, (*c*) was taken. Boiling point, 107–108 degrees centigrade (0.7 millimeter).

*Analysis.*—Calculated for $C_{13}H_{22}N_2$: Neut. Equiv., 103 N, 13.58. Found: Neut. Equiv., 122 N, 12.81.

All three fractions (*a*), (*b*), and (*c*) gave similar titration curves with inflections at pH 3.2 and 6.5.

The analytical data, titration curves and subsequent results indicate that this material is the desired diamine, N-Benzylmethyl-1,3-diamino-2,2-dimethylpropane, contaminated with an unknown product having as its probable origin a rearrangement of the oxime. The mixture is not easily separated into its components by distillation.

PREPARATION 18.—N-METHYL-1,3-DIAMINO-2,2-DIMETHYLPROPANE DIHYDROCHLORIDE

A solution of 20.6 grams (0.1 mole) of the crude benzlymethylamine of Preparation 17 in 100 milliliters of ethanol was acidified with 20 milliliters of glacial acetic acid and hydrogenated at room temperature at an initial pressure of 44 lbs./sq. in., using 5 percent palladium on charcoal as the catalyst. About 130 percent of the calculated amount of hydrogen was absorbed in one and one-half hours, after which absorption ceased. After being filtered, the solution, which smelled strongly of toluene, was stripped. The oily residues from three such runs were combined, dissolved in water, made strongly alkaline and steam-distilled into hydrochloric acid, 4–5 liters of distillate being collected. The distillate was concentrated to a syrup which upon trituration under isopropyl alcohol, solidified to a soft solid weighing 49 grams. This mixture was separated by repeated crystallization from methanol to obtain 24.5 grams of the desired diamine dihydrochloride, melting point, 223–224 degrees centigrade. Potentiometric titration showed a sloping inflection point at pH 8.8.

*Analysis.*—Calculated for $C_6H_{16}N_2 \cdot 2HCl$: Neut. Equiv., 95 N, 14.8. Found: Neut. Equiv., 97 N, 14.79.

There was also obtained 1.7 grams of a crystalline substance, melting point, 213–214 degrees centigrade, the identity of which has not been established. Its analysis (N, 12.34; Cl, 32.12) indicates a unit molecular weight of 114, which is in agreement with the value of 110 obtained from the titration curve which showed one sharp inflection point at pH 7.5.

In addition, 12.5 grams of unresolved mixture was recovered in a crystalline state.

PREPARATION 19.—2-HYDROXYMETHYL-1,4,5,6-TETRAHYDRO - 1,5,5 - TRIMETHYLPYRIMIDINE HYDROCHLORIDE

A solution of 24.6 grams (0.13 mole) of N-methyl-1,3-diamino-2,2-dimethylpropane dihydrochloride in 300 milliliters of methanol was neutralized with 81.3 milliliters (0.26 mole) of 3.2 N methanolic sodium methylate and the percipitated sodium chloride was filtered off. The stirred filtrate was cooled to five degrees centigrade and 18.2 grams (0.13 mole) of ethyl glycolimidate hydrochloride (see Preparation 12) was added. The homogeneous solution was kept at 5 degrees centigrade for 3 hours and allowed to remain at room temperature overnight. The solution was distilled to remove ammonia, acidified with ethanolic hydrogen chloride, and distilled to dryness. The residue was dissolved in isopropyl alcohol, the hot solution was filtered and diluted with ether to precipitate 17 grams (68 percent) of white feathery needles, melting point, 145–149 degrees centigrade after recrystallization from isopropanol-ether.

*Analysis.*—Calculated for $C_8H_{16}N_2O \cdot HCl$: N, 14.54. Found: N, 14.77.

PREPARATION 20.—2-CHLOROMETHYL-1,4,5,6-TETRAHYDRO-1,5,5-TRIMETHYLPYRIMIDINE HYDROCHLORIDE

Sixteen grams (0.33 mole) of the hydroxymethyl compound of Preparation 19 was added to 40 milliliters of thionyl chloride and the solution was refluxed for one-half hour. The thionyl chloride was removed by distillation and the solid residue was recrystallized from a mixture of isopropyl alcohol and ether. Yield, 13.5 grams (77 percent) melting point 177–180 degrees centigrade after a subsequent recrystallization from isopropyl alcohol-ether. It is slightly hygroscopic.

*Analysis.*—Calculated for $C_8H_{15}ClN_2 \cdot HCl$: N, 13.28. Found: N, 13.24.

PREPARATION 21.—ALPHA CYCLOPENTYLPHENYLACETONITRILE

To a stirred suspension of 39.0 grams (1.0 mole) of sodamide in 400 milliliters of dry benzene was added a solution of 118 grams (1.0 mole) of phenylacetonitrile in 50 milliliters of benzene over a 15 minute period at room temperature. The mixture was refluxed for 30 minutes. A solution of 140 grams (0.94 mole) of cyclopentylbromide in 100 milliliters of benzene was then added to it at ice bath temperature over a 40 minute period. The mixture was stirred for 2 hours at room temperature and allowed to remain at room temperature for 2 days. The reaction mixture was washed with 100 milliliters of water, the benzene solution was dried over magnesium sulfate, and the residue obtained after removal of the solvent was distilled to yield 102 grams (55 percent) of alpha-cyclopentylphenylacetonitrile boiling at 135–137 degrees centigrade at 2-2.3 millimeters. (Chem. Abst. 38, 5493 (1944) reports the boiling point as 153–160 degrees centigrade at 2 millimeters.)

PREPARATION 22.—ALPHA-CYCLOPENTYLPHENYLACETIC ACID

A mixture consisting of 102 grams (0.55 mole) of alpha-cyclopentylacetonitrile, 100 milliliters of 50 percent sodium hydroxide solution, and 100 milliliters of propylene glycol was refluxed for 16 hours. The mixture was concentrated to near dryness, diluted with 400 milliliters of water, and treated with Nuchar. Careful acidification of the aqueous solution gave a solid which was recrystallized from dilute acetic acid to yield 90.0 grams (80 percent) of the acid melting at 99–100 degrees centigrade. (Chem. Abst. 38, 5493 (1944) reports the melting point as 103 degrees centigrade.)

PREPARATION 23.—ETHYL-2-THIENYLGLYOXYLATE

To a stirred solution of 142 grams (1.04 moles) of ethyl oxalyl chloride and 87.5 grams (1.04 moles) of thiophene in 1200 milliliters of tetrachloroethane was added 148 grams (1.11 moles) of anhydrous aluminum chloride in portions at —5–0 degrees centigrade over a 40 minute period. The mixture was stirred for 2 hours at ice bath temperature and for 3 hours at room temperature. After remaining for 10 hours at room temperature, the mixture was treated with ice and hydrochloric acid. The organic layer was separated and washed with 150 milliliters of dilute acid ($HCl:H_2O$, 1:1), 5–150 milliliter portions of water, 150 milliliters of dilute sodium carbonate solution, and 150 milliliters of water, respectively. The organic solution was dried over sodium sulphate, the solvent was removed, and the residue was distilled to yield 63.0 grams (33 percent) of ethyl-2-thienylglyoxylate boiling at 122–125 degrees centigrade at 5 millimeters.

PREPARATION 24.—2-THIENYLGLYOXYLIC ACID

A mixture consisting of 63.0 grams (0.342 mole) of ethyl-2-thienylglyoxalate, 74.0 grams (0.70 mole) of sodium carbonate, 110 milliliters of ethanol, and 675 milliliters of water was refluxed for 14 hours, the last 20 minutes with Nuchar. Removal of the solvent yielded a solid residue which was added in portions to a hydrochloric acid-ice mixture layered with 100 milliliters of ether. After all the solid had dissolved, the aqueous portion was extracted further with 2–100 milliliter portions of ether. The combined ether extract was dried over sodium sulfate. A solid residue was obtained upon removal of the ether which was recrystallized from benzene to yield 43.0 grams (80 percent) of 2-thienylglyoxylic acid melting at 90–92 degrees centigrade.

PREPARATION 25.—ALPHA-CYCLOPENTYL-2-THIENYLGLYCOLIC ACID

To a Grignard reagent prepared from 45.0 grams (0.3 mole) of cyclopentylbromide, 7.2 grams (0.3 mole) of magnesium, and 200 milliliters of dry ether was added a solution of 15.6 grams (0.1 mole) of 2-thienylglyoxylic acid in 200 milliliters of dry ether over a 40 minute period at —5–0 degrees centigrade. The reaction mixture in which a solid had formed during the addition was refluxed for 2 hours after remaining at room temperature for 1 hour. The ether was decanted and the solid was treated in the cold with 100 milliliters of dilute sulfuric acid ($H_2O:H_2SO_4$, 3:1) layered with 100 milliliters of ether. The ether layer was separated, and the aqueous solution was extracted with 2–50 milliliters portions of ether. The combined ether solution was extracted with 100 milliliters of 20 percent sodium carbonate solution. After diluting the aqueous extract to 200 milliliters and treating with Nuchar, it was carefully acidified with sulfuric acid in the cold. The oil which separated was dissolved in ether. Removal of the ether yielded 7.0 grams (31 percent) of the crude acid melting at 93–96 degrees centigrade. A small portion of the acid when recrystallized from dilute acetic acid melted at 122–124 degrees centigrade.

PREPARATION 26.—ALPHA-(2-PENTYL)-PHENYLGLYCOLIC ACID

A Grignard reagent prepared from 9.5 grams (0.391 mole) of 2-bromopentane, and 200 milliliters of ether, was added dropwise to a stired solution of 20.0 grams (0.133 mole) of benzoylformic acid in 100 milliliters of benzene at 0.5 degrees centigrade. After the mixture was stirred for an additional 30 minutes at ice bath temperature and 30 minutes at room temperature, it was refluxed gently for 30 minutes. An oil separated during the process. Dilute hydrochloric acid was added at ice bath temperature, and the mixture was stirred until two clear layers were obtained. The organic layer was separated, washed with 25 milliliters of water, and extracted thoroughly with 50 milliliters of 10 percent sodium hydroxide solution. The basic solution was diluted to 100 milliliters, treated with Nuchar, filtered, and acidified carefully to yield an oil which solidified upon warming to remove the volatile organic material. Recrystallization of the solid from heptane yielded 8.0 grams (27 percent) of the acid melting at 115–116 degrees centigrade.

*Analysis.*—Calculated for $C_{13}H_{18}O_3$: Neut. Equiv. 222.3. Found: Neut. Equiv. 220.

PREPARATION 27.—2-HYDROXYMETHYL-4,5,6,7-TETRAHYDRO-1,3-DIAZEPINE HYDROCHLORIDE

A stirred suspension of 16.1 grams (0.1 mole) of 1,4-diaminobutane dihydrochloride in a mixture of 100 milliliters of methanol and 100 milliliters of ethanol was treated with 91 milliliters (0.2 mole) of 2.2 N methanolic sodium methylate. After the mixture had stirred under reflux for about 5 hours, it was filtered to remove 10.3 grams (0.18 mole) of sodium chloride. The filtrate was stirred at 10 degrees centigrade and 13.9 grams (0.1 mole) of ethyl glycolimidate hydrochloride was added to it over a 15 minute period. The glycolimidate dissolved almost immediately and after the solution had stirred at 10 degrees centigrade for one hour it was allowed to remain at room temperature overnight. The solution was refluxed for 8 hours and then distilled to remove most of the ammonia. The residual solution was acidified with ethanolic hydrogen chloride, distilled to approximately 50 milliliters, filtered to remove 2.8 grams of solid, presumably 1,4-diaminobutane dihydrochloride, and diluted with ether. The solid which separated weighed 10 grams (61 percent) and melted at 133–135 degrees centigrade after recrystallization from ethanol-ether. The pure material is a white, hygroscopic solid.

Analysis.—Calculated for $C_6H_{12}N_2O$. HCl:N, 17.02. Found: N, 16.74.

PREPARATION 28.—2-CHLOROMETHYL-4,5,6,7-TETRAHYDRO-1,3-DIAZEPINE HYDROCHLORIDE

A mixture of 9 grams (0.055 mole) of the hydroxymethyl compound of Preparation 27 and 25 milliliters of thionyl chloride was refluxed for one-half hour and the cooled, dark solution was diluted with ether to precipitate a dark solid which was isolated and dissolved in ethanol. The solution was charcoaled and diluted with ether to precipitate the chloromethyl compound as white needles. Yield, 6.5 grams (65 percent); melting point 255–257 degrees centigrade (dec.).

Analysis.—Calculated for $C_6H_{11}ClN_2 \cdot HCl$: N, 15.30. Found: N, 15.02.

The following examples are given to better illustrate certain of the compounds and the processes included within the scope of the present invention, however, they are not to be construed as limiting.

In naming certain of the compounds of the preparations and the examples alternative nomenclature could be used. Thus Example 1 could be named 1, 4, 5, 6-tetrahydro-2-pyrimidylmethyl alpha-cyclohexyl - alpha - phenylacetate hydrochloride as well as 2-(1,4,5,6-tetrahydropyrimidyl) methyl alpha-cyclohexyl alpha-phenylacetate hydrochloride, and some authorities would prefer the former name. Also in numbering the positions on the tetrahydropyrimidyl ring, the 1 position could be called the 3 position.

*Example 1.—2-(1,4,5,6-tetrahydropyrimidyl)methyl alpha-cyclohexyl-alpha-phenylacetate hydrochloride*

A solution of 4.1 grams (0.019 mole) of alpha-cyclohexyl-alpha-phenyl acetic acid and 2.5 grams (0.019 mole) of 2-chloromethyl-1,4,5,6-tetrahydropyrimidine hydrochloride in 100 milliliters of isopropanol, containing 0.5 gram of potassium iodide, was refluxed for six hours. The mixture was filtered, the filtrate concentrated to approximately 30 milliliters and thereafter diluted with 100 milliliters of ether. The white solid, 2-(1,4,5,6-tetrahydropyrimidyl)methyl alpha-cyclohexyl-alpha-phenylacetate hydrochloride, which separated, was isolated, and recrystallized from a mixture of ethanol and ether to yield 2.3 grams of the product. This product melted at 234–235 degrees centigrade.

Analysis.—Calculated for $C_{19}H_{26}N_2O_2 \cdot HCl$: N, 7.99; Cl, 10.1. Found: N, 7.81; Cl, 10.1.

*Example 2.—2-(4,5 - dihydroimidazolyl)methyl alpha-cyclohexyl-alpha-phenylglycolate hydrochloride*

A mixture of 4.7 grams 0.02 mole) of alpha cyclohexyl alpha-phenylglycolic acid, 2.5 grams (0.02 mole) of 2-chloromethylimidazoline, 0.2 gram of potassium iodide, and 60 milliliters of isopropanol was refluxed for six hours. The solution was distilled to remove the alcohol and the residue was dissolved in water. The solution was thereafter clarified by ether extraction. After making the solution alkaline with sodium hydroxide, the liberated oily base was extracted with ether, and the dry ether solution treated with an ether solution of hydrogen chloride. The solid which resulted was separated by filtration, and recrystallized from a mixture of alcohol and ether. There was thus obtained 1.4 grams of 2-(4,5-dihydroimidazolyl)methyl alpha-cyclohexyl-alpha-phenylglycolate hydrochloride, melting at 207–208 degrees centigrade with decomposition.

*Example 3.—2-(1,4,5,6-tetrahydropyrimidyl)methyl 1-phenyl-1-hydroxycaproate hydrochloride*

To a solution of 4.2 grams (0.02 mole) of 1-phenyl-1-hydroxycaproic acid and 3.0 grams (0.022 mole) of 2-chloromethyl-1,4,5,6-tetrahydropyrimidine in 40 milliliters of isopropanol there was added 0.1 gram of potassium iodide, and the mixture was refluxed for four hours. The hot solution was filtered and thereafter diluted with ether. The solid which separated was isolated and recrystallized from isopropanol. There was thus obtained 3.2 grams of 2-(1,4,5,6-tetrahydropyrimidyl) methyl 1-phenyl-1-hydroxycaproate hydrochloride, melting at 198–199 degrees centigrade.

Analysis.—Calculated N 8.22, Cl 10.40. Found 8.03, 10.31.

*Example 4.—2-(1,4,5,6-tetrahydropyrimidyl)methyl benzilate hydrochloride*

A mixture of 4.6 grams (0.02 mole) of benzilic acid, 3.0 grams (0.034 mole) of 2-chloromethyl-1,4,5,6-tetrahydropyrimidine, 0.5 grams potassium iodide, and 125 milliliters of isopropanol was refluxed for 6 hours. The admixture was filtered and the filtrate cooled. The solid which separated was isolated and recrystallized from 35 milliliters of methanol to which a small amount of sodium bisulfite had been added. There was thus obtained 3.0 grams (42 percent of the theoretical yield) of colorless crystals, 2-(1,4,5,6-tetrahydropyrimidyl) methyl benzilate hydrochloride, melting at 218–219 degrees centigrade with decomposition.

*Example 5.—2-(4,5-dihydroimidazolyl)methyl benzilate hydrochloride*

A mixture of 8.7 grams (0.04 mole) of benzilic acid, 4.8 grams (0.04 mole) of 2-chloromethylimidazoline, 1.0 gram potassium iodide, and 125 milliliters of isopropanol was refluxed for 45 minutes, during which a solid separated from the refluxing mixture. The mixture was cooled, filtered, and the solid recrystallized from 350 milliliters of ethanol. There was thus obtained 6.5 grams (47 percent of the theoretical yield of 2-(4,5-dihydroimidazolyl)methyl benzilate hydrochloride, melting at 202–203 degrees centigrade with decomposition. A subsequent recrystallization from 60 milliliters of methanol yielded 4.4 grams of colorless needles, melting at 211–212 degrees centigrade with decomposition.

*Example 6.—2-(1,4,5,6-tetrahydropyrimidyl)methyl diphenylacetate hydrochloride*

A mixture of 4.24 grams (0.02 mole) of diphenylacetic acid, 3.0 grams (0.02 mole) of 2-chloromethyl-1,4,5,6-tetrahydropyrimidine, 0.5 gram potassium iodide, and 125 milliliters of isopropanol was refluxed for 5 hours and filtered. The solid which separated from the cooled filtrate weighed 4.5 grams (65 percent of the theoretical yield) and melted at 237–238 degrees centigrade, with decomposition, after recrystallization from ethanol. This material is 2-(1,4,5,6-tetrahydropyrimidyl)methyl diphenylacetate hydrochloride.

Analysis.—Calculated for $C_{19}H_{20}N_2O_2 \cdot HCl$: N, 8.13. Found: N, 7.99.

*Example 7. — 2 - (1,4,5,6 - tetrahydropyrimidyl)methyl phenyl-2-thienylglycolate hydrochloride*

A mixture of 5.8 grams (0.025 mole) of phenyl-2-thienylglycolic acid, 3.5 grams (0.025 mole) of 2-chloromethyl-1,4,5,6-tetrahydropyrimidine, 0.5 gram of potassium iodide, and 100 milliliters of isopropanol was refluxed for 6 hours, the last fifteen minutes of which was in the presence of decolorizing charcoal. The mixture was filtered and the filtrate was cooled, whereupon a solid separated. It weighed 3.5 grams (38 percent of the theoretical yield) and melted at 213–214 degrees centigrade, with decomposition, after recrystallization from a mixture of methanol and ether. This material was 2-(1,4,5,6-tetrahydropyrimidyl)methyl phenyl-2-thienylglycolate hydrochloride.

Analysis.—Calculated for $C_{17}H_{18}N_2O_3S \cdot HCl$: N, 7.64 Cl 9.67. Found: N, 7.63 Cl 9.83.

Example 8.—2-(4,5-dihydroimidazolyl)methyl diphenylacetate hydrochloride

A solution containing 8.5 grams (0.04 mole) of diphenylacetic acid and 4.8 grams (0.04 mole) of 2-chloromethylimidazoline in 80 milliliters of isopropanol was refluxed for 9 hours. The solid was removed, the residue was taken up in water, and the insoluble material extracted with ether. The aqueous solution was made alkaline and the liberated ester base was extracted with ether. After the ether solution had been dried over anhydrous magnesium sulfate, it was treated with an ether solution of hydrogen chloride. The precipitated oily hydrochloride was recrystallized from a mixture of ethanol and ether. There was thus obtained 1.0 gram of 2-(4,5-dihydroimidazolyl) methyl diphenylacetate hydrochloride, melting at 201–202 degrees centigrade.

Analysis.—Calculated for $C_{18}H_{18}N_2O_2 \cdot HCl$: N, 8.47. Found: N, 8.34.

Example 9. — 2 - (1,4,5,6 - tetrahydropyrimidyl)methyl alpha-cyclohexylphenylglycolate hydrochloride A mixture of 4.7 grams (0.02 mole) of alpha-cyclohexylphenylglycolic acid, 2.65 grams (0.02 mole) of 2-chloromethyl-1,4,5,6-tetrahydropyrimidine base, 0.3 gram potassium iodide and 75 milliliters of isopropanol was stirred and refluxed for three hours during which the solid ester hydrochloride separated from the reaction mixture. The mixture was cooled, the solid isolated and recrystallized from a mixture of ethanol and ether. There was thus obtained 3.4 grams (46 percent of the theoretical yield) of 2-(1,4,5,6-tetrahydropyrimidyl)methyl alpha-cyclohexylphenylglycolate hydrochloride melting at 237–238 degrees centigrade with decomposition.

Analysis.—Calculated for $C_{19}H_{27}ClN_2O_3$: N, 7.64. Found: N, 7.59.

By suspending the above product in water and making the mixture alkaline by the addition of a quantity of sodium hydroxide, extracting the resulting mixture with an appropriate quantity of ether, separating the ether solution and contacting this ether solution with an appropriate acid or an ester containing an inorganic anion, such as, for examples, hydrobromic, nitric, sulfuric, phosphoric, citric, tartaric, picric, acetic acids, et cetera, or methyl iodide, ethyl bromide, propyl chloride, benzyl chloride, et cetera, the corresponding acid addition salts are precipitated therefrom. In the event that precipitation does not occur, the solvent can be removed by distillation to yield a residue containing the acid addition salts. These salts may be purified by conventional recrystallization techniques.

Example 10. — 4 - methyl - 1,4,5,6 - tetrahydro - 2 - pyrimidylmethyl alpha-cyclohexylphenylglycolate hydrochloride A mixture of 3.5 grams (0.015 mole) of alpha-cyclohexylphenylglycolic acid, 2.2 grams (0.015 mole) of 2 - chloromethyl - 4 - methyl - 1,4,5,6 - tetrahydropyrimidine, 0.3 gram of powdered potassium iodide and 50 milliliters of isopropanol was refluxed for four hours during which the solid ester hydrochloride separated. The mixture was cooled, filtered and the solid (4.6 grams) was recrystallized from 100 milliliters of ethanol. There was thus obtained 3.0 grams (53 percent of the theoretical yield) of 4-methyl-1,4,5,6-tetrahydro-2-pyrimidylmethyl alpha-cyclohexylphenylglycolate hydrochloride, melting at 244–245 degrees centigrade with decomposition.

Analysis.—Calculated for $C_{20}H_{23}N_2O_3 \cdot HCl$: N, 7.36. Found: N, 733.

Example 11. — 4 - methyl - 1,4,5,6 - tetrahydro - 2 - pyrimidylmethyl alpha-cyclohexylphenylacetate hydrochloride A solution of 6.3 grams (0.034 mole) of 2-chloromethyl - 4 - methyl - 1,4,5,6 - tetrahydropyrimidine hydrochloride in 50 milliliters of isopropanol was neutralized by the addition of 16 milliliters of 2.13 Normal alcoholic sodium ethylate, whereupon sodium chloride separated as a finely divided solid. To this mixture there was added a solution of 7.5 grams (0.034 mole) of alpha-cyclohexylphenylacetic acid in 59 milliliters of isopropanol and the mixture was filtered. Powdered potassium iodide (0.3 gram) was added, the solution was refluxed for six hours and filtered while hot. The solid (7.9 grams) which separated from the cooled solution was recrystallized from ethanol. There was thus obtained 6.3 grams (51 percent of the theoretical yield) of 4-methyl - 1,4,5,6 - tetrahydro - 2 - pyrimidylmethyl alpha-cyclohexylphenylacetate hydrochloride, melting point of 235–236 degrees centigrade with decomposition.

Analysis.—Calculated for $C_{20}H_{28}N_2O_2 \cdot HCl$: N, 7.68. Found: N, 7.52.

Example 12. — 4 - methyl -1,4,5,6 - tetrahydro - 2 - pyrimidylmethyl alpha-n-butylphenylglycolate hydrochloride A mixture of 6.2 grams (0.03 mole) of alpha-n-butylphenylglycolic acid, 4.4 grams (0.03 mole) of 2-chloromethyl-4-methyl-1,4,5,6-tetrahydropyrimidine, 0.2 gram powdered potassium iodide and 100 milliliters of isopropanol was refluxed for six hours. The hot solution was filtered and concentrated to about one-third volume and cooled. The solid which separated was isolated, and the mother liquor was diluted with ether to obtain a second crop of solid. The crude solids were combined (about 2.5 grams) and purified by recrystallization from isopropanol. There was thus obtained 1 gram of 4-methyl - 1,4,5,6 - tetrahydro - 2 - pyrimidylmethyl alpha - n-butylphenylglycolate hydrochloride melting at 199–200 degrees centigrade.

Analysis.—Calculated for $C_{18}H_{26}N_2O_3 \cdot HCl$: N, 7.90. Found: N, 7.90.

Example 13. — 4 - methyl - 4,5 - dihydro - 2 - imidazolylmethyl alpha-cyclohexylphenylglycolate hydrochloride A mixture of 2.1 grams (0.009 mole) of alpha-cyclohexylphenylglycolic acid, 1.52 grams (0.009 mole) of 2-chloromethyl-4-methyl-imidazoline hydrochloride, 0.9 gram (0.009 mole) of triethylamine, 0.1 gram powdered potassium iodide and 59 milliliters of isopropanol was refluxed for six hours. The solution was diluted with ether and the solid, triethylamine hydrochloride, was filtered off. The filtrate was vacuum distilled to an oil residue which was taken up in water, the solution was made alkaline and extracted with ether. Acidification of the ether solution with ethereal hydrogen chloride precipitated an oil which solidified. It was recrystallized from isopropanol-ether to yield 0.4 gram of 4-methyl-4,5 - dihydro - 2 - imidazolylmethyl alpha - cyclohexylphenylglycolate hydrochloride melting at 166–167 degrees centigrade.

Analysis.—Calculated for $C_{19}H_{26}N_2O_3 \cdot HCl$: N, 7.64. Found: N, 7.70.

*Example 14. — 1 - methyl - 1,4,5,6 - tetrahydro - 2 - pyrimidylmethyl benzilate hydrochloride*

A solution of 2.5 grams (0.0135 mole) of 2-chloromethyl - 1 - methyl - 1,4,5,6 - tetrahydropyrimidine hydrochloride in 25 milliliters of isopropanol was neutralized with 19 milliliters (0.0135 mole) of 0.715 Normal ethanolic sodium ethylate and combined with a solution of 3.5 grams (0.015 mole) of benzilic acid in 25 milliliters of isopropanol. The mixture was filtered, 0.3 gram of powdered potassium iodide was added and the mixture was refluxed overnight (14 hours). The hot solution was filtered, and the solid which separated from the cooled filtrate was isolated and recrystallized from a mixture of methanol and ether. There was thus obtained 1.9 grams of 1-methyl-1,4,5,6-tetrahydro-2-pyrimidylmethyl benzilate hydrochloride melting at 219–220 degrees centigrade with decomposition.

*Analysis.*—Calculated for $C_{20}H_{22}N_2O_3 \cdot HCl$: N, 7.48. Found: N, 7.47.

*Example 15. — 1 - methyl - 1,4,5,6 - tetrahydro - 2 - pyrimidylmethyl alpha - cyclohexylphenylglycolate hydrobromide*

Method (1) An aqueous suspension of 10 grams (0.028 mole) of 1,4,5,6-tetrahydro-2-pyrimidylmethyl alpha-cyclohexylphenylglycolate hydrochloride [from Example 9], was made alkaline with dilute sodium hydroxide, and the liberated ester base was extracted with ether. The ether extract was evaporated to an oil which was dissolved in 75 milliliters of chloroform and filtered. Twenty milliliters of methyl bromide was added, and the solution, contained in a pressure bottle, was heated at 50–100 degrees centigrade for two hours. The removal of the solvent left an oily solid which was triturated under ether to a granular solid weighing 6.5 grams (60 percent of the theoretical yield) and melting at 209–210 degrees after recrystallization from a mixture of ethanol and ether.

*Analysis.*—Calculated for $C_{20}H_{28}N_2O_3 \cdot HBr$: N, 6.59. Found: N, 6.67.

Method (2) One half gram of 1-methyl-1,4,5,6-tetrahydro - 2 - pyrimidylmethyl alpha - cyclohexylglycolate hydrochloride in 5 milliliters of water was made alkaline with sodium hydroxide and the liberated ester base was extracted with ether. The ether solution was dried over anhydrous potassium carbonate and treated with gaseous hydrogen bromide. The solid which separated was recrystallized from isopropanol. There was thus obtained 0.3 gram of product melting at 211–212 degrees centigrade with decomposition. Mixed melting point with product from method (1) was 210 degrees with decomposition. The melting point can vary with the rate of heating.

*Analysis.*—Calculated for $C_{20}H_{28}N_2O_3 \cdot HBr$: N, 6.59. Found: N, 6.54.

A comparison of the ultra-violet absorption curves of the products from methods (1) and (2) indicated that the compounds are identical.

*Example 16.—1-methyl-1,4,5,6-tetrahydro-2-pyrimidylmethyl alpha-cyclohexylphenylglycolate hydrochloride*

A solution of 1.8 grams (0.01 mole) of 2-chloromethyl-1-methyl-1,4,5,6-tetrahydropyrimidine hydrochloride in 5 milliliters of water was made alkaline with 5 milliliters 50 percent NaOH and extracted with ether. The ether solution, which contained the basic chloride, was dried over calcium sulfate and added to a solution of 2.3 grams (0.01 mole) of alpha-cyclohexylphenylglycolic acid in 75 milliliters of isopropanol. The solution was distilled to remove the ether, and 0.1 gram of powdered potassium iodide added to the residual isopropanol solution which was then refluxed for six hours. The solid which had separated was redissolved by the addition of 20 milliliters of ethanol and the solution charcoaled, concentrated and cooled. The solid which separated, 1-methyl-1,4,5,6-tetrahydro-2-pyrimidylmethyl alpha-cyclohexylphenylglycolate hydrochloride, weighed 1.4 grams and melted at 228–229 degrees centigrade with decomposition after recrystallization from ethanol.

*Analysis.*—Calculated for $C_{20}H_{28}N_2O_3 \cdot HCl$: N, 7.36. Found: N, 714.

*Example 17.—1,4-dimethyl-1,4,5,6-tetrahydro-2-pyrimidylmethyl alpha-cyclohexylphenylacetate hydrobromide*

An aqueous suspension of 3.6 grams (0.001 mole) of 4-methyl-1,4,5,6-tetrahydro-2-pyrimidylmethyl alpha-cyclohexylphenylacetate hydrochloride, contained in a separatory funnel, was layered with ether, and made alkaline with dilute sodium hydroxide solution. The mixture was shaken until two clear layers were obtained, and the ether layer was distilled under reduced pressure to an oil residue. The oil was dissolved in 50 milliliters of isopropanol, 10 milliliters (0.18 mole) of methyl bromide was added, and the homogeneous solution, contained in a pressure bottle, was heated at 60 degrees centigrade for three and one-half hours. The solvent was almost completely removed by distillation and the residual solution was carefully diluted with ether to precipitate 2.2 grams (50 percent of the theoretical yield) of a white crystalline solid, 1,4-dimethyl-1,4,5,6-tetrahydro-2-pyrimidylmethyl alpha-cyclohexylphenylacetate hydrobromide, melting at 161–163 degrees centigrade, after recrystallization from isopropanol-ether.

*Analysis.*—Calculated for $C_{21}H_{30}N_2O_2 \cdot HBr$: N, 6.62. Found: N, 6.52.

*Example 18.—1,4-dimethyl-1,4,5,6-tetrahydro-2-pyrimidylmethyl alpha-cyclohexylphenylglycolate hydrobromide*

Four and one-half grams (0.012 mole) of 4-methyl-1,4,5,6-tetrahydro-2-pyrimidylmethyl phenylglycolate hydrochloride was suspended in water in a separatory funnel, a layer of ether was added, and the mixture was made alkaline with dilute sodium hydroxide. The mixture was shaken until two clear layers were obtained. The ether layer was washed with water and distilled under reduced pressure to an oil. The oil was dissolved in 50 milliliters of isopropanol, 10 milliliters (0.18 mole) of methyl bromide was added and the solution, contained in a pressure bottle, was maintained at 24–45 degrees centigrade for four days during which a solid separated. The solid was isolated and washed thoroughly with isopropanol and then with ether. There was thus obtained 1.1 grams of 1,4 - dimethyl - 1,4,5,6 - tetrahydro-2-pyrimidylmethyl alpha-cyclohexylphenylglycolate hydrobromide, melting at 201–204 degrees centigrade. The melting point was lowered rather than improved by recrystallization from alcohol-ether mixtures.

*Analysis.*—Calculated for $C_{21}H_{30}N_2O_3 \cdot HBr$: N. 6.38. Found: N, 6.15.

*Example 19.—4-methyl-1,4,5,6-tetrahydro-2-pyrimidylmethyl alpha-cyclopentylphenylglycolate hydrochloride*

A solution of 2.7 grams (0.015 mole) of 2-chloromethyl-4-methyl-1,4,5,6-tetrahydropyrimidine hydrochloride in 25 milliliters of isopropanol was neutralized with 6.7 milliliters (0.015 mole) of 2.23 Normal ethanolic sodium ethylate and filtered into a solution of 3.3 grams (0.015 mole) of alpha-cyclophentylphenylglycolic acid in 50 milliliters of isopropanol. About 0.1 gram of powdered potassium iodide was added and the solution was refluxed for one-half hour. The solid which separated during this period was purified by recrystallization from ethanol-ether. There was thus obtained 1.4 grams of 4-methyl-1,4,5,6-tetrahydro-2-pyrimidylmethyl alpha-cyclopentylphenylglycolate hydrochloride, melting at 239–240 degrees centigrade with decomposition.

*Analysis.*—Calculated for $C_{19}H_{26}N_2O_3 \cdot HCl$: N, 7.64. Found: N, 7.39.

Example 20

In a manner similar to that of the foregoing examples, 4-methyl-4, 5-dihydro-2-imidazolylmethyl alpha-cyclopentylphenylglycolate hydrochloride, as white platelets, melting at 192–193 degrees centigrade, soluble to an extent of approximately 10 percent in water at 20 degrees centigrade, analysis, calculated N, 7.94, found, N, 7.81; 1-ethyl-1,4,5,6-tetrahydro-2-pyrimidylmethyl alpha-cyclohexylphenylglycolate hydrochloride, as white platelets, melting, with decomposition at 202–203 degrees centigrade soluble to an extent of approximately 2 percent in water at 20 degrees centigrade, analysis, calculated, N, 710, found, N, 693; 1-butyl-1,4,5,6-tetrahydro-2-pyrimidylmethyl alpha-cyclohexylphenylglycolate hydrochloride, as white needles, melting at 175–176 degrees centigrade, soluble to an extent of approximately 20 percent in water at 20 degrees centigrade, analysis, calculated, N, 6.62, found, N, 6.44; and, 1-ethyl-1,4,5,6-tetrahydro-2-pyrimidylmethyl alpha-cyclopentylphenylglycolate hydrochloride, as white platelets, melting at 177–178 degrees centigrade with slight decomposition, soluble to the extent of approximately 20 percent in water at 20 degrees centigrade, analysis, calculated, N, 7.36, found, N, 7.32 were all prepared.

Example 21

In a manner similar to the foregoing examples, the following compounds may be prepared from appropriate intermediate materials: 4-hexyl-4,5-dihydro-2-imidazolylmethyl alpha-bistolylcaproate citrate, 1-heptyl-4,5-dihydro-2-imidazolylmethyl alpha-hydroxy-alpha-bisnaphthylacetate lactate, 4-propyl-4,5-dihydro-2-imidazolylmethyl bis-(parahydroxyphenyl)acetate phosphate, 6-pentyl-1,4,5,6-tetrahydro-2-pyrimidylmethyl alpha-phenyl-alpha-cycloheptylbutyrate bitartrate, 5-propyl-4,5-dihydro-2-imidazolylmethyl alpha-propoxy-alpha-bisnaphthylacetate picrate, et cetera.

Example 22.—1-methyl-1,4,5,6-tetrahydro-2-pyrimidylmethyl alpha-cyclopentyl-alpha-phenylglycolate hydrochloride A solution of 2.5 grams (0.0135 mole) of 2-chloromethyl-1-methyl-1,4,5,6-tetrahydropyrimidine hydrochloride in 25 milliliters of isopropanol was neutralized with 19 milliliters of 0.715 Normal sodium methylate in methanol. The mixture was filtered into a solution of 3.0 grams of alpha-cyclopentyl-alpha-phenylglycolic acid dissolved in 35 milliliters of isopropanol.

After refluxing the mixture for 5 hours, it was filtered while hot. Upon cooling the resultant clear solution, the solid which formed was recovered and recrystallized from a mixture of isopropanol-methanol (4:1). There was thus obtained 1.5 gram of 1-methyl-1,4,5,6-tetrahydro-2-pyrimidylmethyl alpha-cyclopentyl-alpha-phenylglycolate hydrochloride melting at 217–218 degrees centigrade.

Analysis.—Calculated for $C_{19}H_{26}N_2O_3 \cdot HCl$: N, 7.64. Found: N, 7.52.

Example 23.—1,4-dimethyl-1,4,5,6-tetrahydro-2-pyrimidylmethyl alpha-cyclohexylphenylacetate hydrobromide An aqueous suspension of 3.6 grams (0.001 mole) of 4-methyl-1,4,5,6-tetrahydro-2-pyrimidylmethyl alpha-cyclohexylphenylacetate hydrochloride, contained in a separatory funnel, was layered with ether, and made alkaline with dilute sodium hydroxide solution. The mixture was shaken until two clear layers were obtained, and the ether layer was distilled under reduced pressure to an oil residue. The oil was dissolved in 50 milliliters of isopropanol, 10 milliliters (0.18 mole) of methyl bromide was added and the homogeneous solution contained in a pressure bottle, was heated at 60 degrees centigrade for three and one-half hours. The solvent was almost completely removed by distillation and the residual solution was carefully diluted with ether to precipitate 2.2 grams (50 percent) of a white crystalline solid, 1,4-dimethyl-1,4,5,6-tetrahydro-2-pyrimidylmethyl alpha-cyclohexylphenylacetate hydrobromide, melting at 161–163 degrees centigrade, after recrystallization from isopropanol-ether.

Analysis.—Calculated for $C_{21}H_{30}N_2O_2 \cdot HBr$: N, 6.62. Found: N, 6.52.

Example 24.—4,5,6,7-tetrahydro-2-(1,3-diazepinyl)methyl alpha-cyclohexylphenylgylcolate hydrochloride A solution of 2.7 grams (0.015 mole) of 2-chloromethyl-4,5,6,7-tetrahydro-1,3-diazepine hydrochloride in 20 milliliters of methanol was neutralized with 6.8 milliliters (0.015 mole) of 2.2 Normal methanolic sodium methylate and added to a solution of 3.5 grams (0.015 mole) of alpha-cyclohexylphenylglycolic acid in 40 milliliters of isopropanol. After the solution was filtered, 0.3 gram of potassium iodide was added and the solution was refluxed for 4 hours. The hot solution was filtered, diluted with ether and refrigerated to precipitate 2.2 grams of 4,5,6,7-tetrahydro-2-(1,3-diazepinyl)methyl alpha-cyclohexylphenylglycolate hydrochloride, (M.P.) 232–233° C. (dec.) subsequent recrystallization from a mixture of methanol and ether.

Analysis.—Calculated for $C_{20}H_{28}N_2O_3 \cdot HCl$; N, 7.36. Found: N, 7.44.

Example 25.—2-(4-methyl-1,4,5,6-tetrahydropyrimidyl)-methyl alpha-cyclopentylphenyl-acetate hydrochloride A solution of 2.7 grams (0.0145 mole) of 2-chloromethyl-4-methyl-1,4,5,6-tetrahydropyrimidine hydrochloride in 50 milliliters of isopropanol was neutralized by the addition of 4.3 cubic centimeters (0.0145 mole) of 3.2 Normal methanolic sodium methylate. To this mixture was added 3.1 grams (0.0145 mole) of alpha-cyclopentylphenylacetic acid in 50 milliliters of isopropanol and the mixture was filtered. Powdered potassium iodide (0.2 gram) was added and the solution was refluxed for six hours and filtered while hot. The solid which separated from the cooled solution was recrystallized from ethanol-ether to yield 3.2 grams of a white, crystallized solid, 2-(4-methyl-1,4,5,6-tetrahydropyrimidyl)methyl alpha-cyclopentylphenylacetate hydrochloride, melting at 227–228 degrees centigrade.

Analysis.—Calculated for $C_{19}H_{26}N_2O_2 \cdot HCl$: N, 7.99. Found: N, 8.07.

Example 26.—1-methyl-1,4,5,6-tetrahydro-2-pyrimidylmethyl alpha-butylphenylglycolate hydrochloride A solution of 3.3 grams (0.018 mole) of 2-chloromethyl-1-methyl-1,4,5,6-tetrahydropyrimidine hydrochloride in isopropanol was neutralized with 4.9 milliliters of 3.66 N (0.018 mole) sodium methylate solution and filtered into a solution of 3.7 grams (0.018 mole) of alpha-butylphenylglycolic acid in 100 milliliters of isopropanol. After adding about 0.1 gram of powdered potassium iodide, the mixture was refluxed gently for 15 hours. The solvent was removed to yield a solid which was triturated with anhydrous ether and washed with 15 milliliters of cold isopropanol. Two recrystallizations of the solid from ethanol-ether yielded 2.0 grams (32 percent) of the basic ester, 1-methyl-1,4,5,6-tetrahydro-2-pyrimidylmethyl alpha-butylphenylglycolate hydrochloride, melting at 194–195 degrees centigrade.

Analysis.—Calculated for $C_{18}H_{26}N_2O_3 \cdot HCl$: N, 7.90. Found: N, 7.94.

Example 27.—1-methyl-1,4,5,6-tetrahydro-2-pyrimidylmethyl alpha-hexylphenylglycolate hydrochloride A solution of 3.7 grams (0.02 mole) of 2-chloromethyl-1-methyl-1,4,5,6-tetrahydropyrimidine hydrochloride in 50 milliliters of isopropanol was neutralized with 5.5 milliliters of 3.66 N (0.02 mole) of sodium methylate solution and filtered into a solution of 4.7 grams (0.02 mole) of alpha-hexylphenylglycolic acid in 100 milliliters of isopropanol. After adding about 0.1 gram of powdered potassium iodide, the mixture was refluxed for 15 hours, treated with Nuchar, and concentrated to a resinous residue. Trituration of the gum with dry ether and washing the resulting semi-solid with 20 milliliters of cold isopropanol gave a solid which, upon repeated recrystallization from isopropanol-ether yielded 0.5 gram (6.5 percent) of the basic ester, 1-methyl-1,4,5,6-tetrahydro-2-pyrimidylmethyl alpha-hexylphenylglycolate hydrochloride, melting at 171–172 degrees centigrade.

*Analysis.*—Calculated for $C_{20}H_{30}N_2O_3 \cdot HCl$: N, 7.32. Found: N, 7.27.

*Example 28.—1-methyl-1,4,5,6-tetrahydro - 2 - pyrimidylmethyl alpha-(2-pentyl)-phenylglycolate hydrochloride*

A solution of 3.3 grams (0.018 mole) of 2-chloromethyl-1-methyl - 1,4,5,6 - tetrahydropyrimidine hydrochloride in 50 milliliters of isopropanol was neutralized with 4.9 milliliters of 3.66 N (0.018 mole) of sodium methylate solution and filtered into a solution of 4.0 grams (0.018 mole) of alpha-(2-pentyl)-phenylglycolic acid in 75 milliliters of isopropanol. After adding about 0.1 gram of powdered potassium iodide, the mixture was refluxed for 15 hours, treated with Nuchar, and concentrated to dryness. The resulting gum was triturated with dry ether and washed with 20 milliliters of cold isopropanol to yield a solid. Fractional crystallization of the solid from isopropanol-ether and recrystallization of the higher melting portion from the same solvent yield 0.3 gram (5 percent) of the basic ester, 1-methyl-1,4,5,6-tetrahydro-2-pyrimidylmethyl alpha-(2-pentyl)-phenylglycolate hydrochloride, melting at 217–218 degrees centigrade.

*Analysis.*—Calculated for $C_{19}H_{28}N_2O_3 \cdot HCl$: N, 7.60. Found: N, 7.61.

*Example 29. — 1,4-dimethyl-1,4,5,6-tetrahydro-2-pyrimidylmethyl benzilate hydrochloride*

A solution of 3.9 grams (0.02 mole) of 2-chloromethyl-1,4-dimethyl-1,4,5,6-tetrahydropyrimidine hydrochloride in 20 milliliters of isopropyl alcohol was neutralized with 7.6 milliliters of 2.62 N methanolic sodium methylate, and combined with a solution of 4.6 grams (0.02 mole) of benzilic acid in 30 milliliters of isopropyl alcohol. The mixture was filtered and refluxed in the presence of 0.3 gram potassium iodide for six hours. The solvent was removed and the residue was taken up in water and extracted with ether. The aqueous solution was made alkaline and the liberated ester base was extracted with ether. Acidification of the ether solution with ethereal hydrogen chloride precipitated an oil which solidified and was recrystallized twice from ethanol-ether. Yield, 0.9 gram of 1,4-dimethyl-1,4,5,6-tetrahydro-2-pyrimidylmethyl benzilate hydrochloride, melting at 204–205 degrees centigrade (slight decomposition).

*Analysis.*—Calculated for $C_{21}H_{24}N_2O_3 \cdot HCl$: N, 7.22. Found: N, 7.11.

*Example 30. — 1,4-dimethyl-1,4,5,6-tetrahydro-2-pyrimidylmethyl alpha-cyclopentylphenylglycolate hydrochloride*

Following the procedure of Example 29, but using 2 grams (0.01 mole) 2-chloromethyl-1,4-dimethyl-1,4,5,6-tetrahydro-pyrimidine hydrochloride in 35 milliliters isopropanol; and neutralizing with 3.8 cc. (0.01 mole) 2.62 N methanolic sodium methylate; and using 2.1 grams (0.01 mole) alpha-cyclopentylphenylglycolic acid and 0.2 gram potassium iodide, there was obtained 0.6 gram of white crystalline solid, 1,4-dimethyl-1,4,5,6-tetrahydro-2-pyrimidylmethyl alpha-cyclopentylphenylglycolate hydrochloride, melting at 184–185 degrees centigrade.

*Analysis.*—Calculated for $C_{20}H_{28}N_2O_3 \cdot HCl$: N, 7.36. Found: N, 7.36.

*Example 31.—1,5,5-trimethyl-1,4,5,6-tetrahydro-2-pyrimidylmethyl alpha-cyclohexylphenylacetate hydrochloride*

A solution of 2.11 grams (0.01 mole) of 2-chloromethyl-1,4,5,6-tetrahydro - 1,5,5 - trimethylpyrimidine hydrochloride in 25 milliliters of isopropyl alcohol was neutralized with 9.5 milliliters (0.01 mole) of 1.05 N methanolic sodium ethylate and added to a solution of 2.2 grams (0.01 mole) alpha-cyclohexylphenylacetic acid in 25 milliliters of isopropyl alcohol. Potassium iodide (0.2 gram) was added and the mixture was refluxed for 16 hours and filtered. The filtrate was concentrated to an oil which was taken up in water, extracted with ether, made alkaline and the liberated oily ester base was extracted with ether. The ether extract was acidified with ethereal hydrogen chloride and distilled to an oil which solidified after it had been dried by azeotropic distillation with isopropyl alcohol. The solid was recrystallized from a mixture of isopropyl alcohol and ether to obtain 1.3 grams (33 percent) of 1,5,5-trimethyl-1,4,5,6-tetrahydro-2-pyrimidylmethyl alpha-cyclohexylphenylacetate hydrochloride, as a white crystalline solid, melting at 201–202 degrees centigrade (slight decomposition).

*Analysis.*—Calculated for $C_{22}H_{32}N_2O_2 \cdot HCl$: N, 7.13. Found: N, 7.33.

*Example 32.—1,5,5-trimethyl-1,4,5,6-tetrahydro-2-pyrimidylmethyl alpha-cyclopentylphenylglycolate hydrochloride*

Following the procedure of Example 31, but using 1.25 grams (0.0059 mole) 2-chloromethyl-1,4,5,6-tetrahydro-1,5,5-trimethylpyrimidine hydrochloride, 5.6 milliliters (0.01 mole) 1.05 N methanolic sodium methylate, 1.3 grams (0.0059 mole) alpha-cyclopentylphenylglycolic acid, 0.2 gram potassium iodide, and 35 milliliters isopropanol, there was obtained 1.1 grams of a near-white crystalline solid, 1,5,5-trimethyl-1,4,5,6-tetrahydro-2-pyrimidylmethyl alpha-cyclopentylphenylglycolate hydrochloride, melting at 180–181 degrees centigrade (after recrystallization from isopropanol-ether).

*Analysis.*—Calculated for $C_{21}H_{30}N_2O_3 \cdot HCl$: N, 7.10. Found: N, 7.03.

*Example 33.—1,5,5-trimethyl-1,4,5,6-tetrahydro-2-pyrimidylmethyl alpha-cyclohexylphenylglycolate hydrochloride*

Following the procedure of Example 31, but using 2.11 grams (0.01 mole) 2-chloromethyl-1,4,5,6-tetrahydro-1,5,5-trimethylpyrimidine hydrochloride, 9.5 milliliters (0.01 mole) 1.05 N methanolic sodium methylate, 2.34 grams (0.01 mole) alpha-cyclohexylphenylglycolic acid, 0.2 gram potassium iodide, and 50 milliliters isopropanol, there was obtained 1 gram of a pure white crystalline solid, 1,5,5-trimethyl-1,4,5,6-tetrahydro-2-pyrimidylmethyl alpha - cyclohexylphenylglycolate hydrochloride, which melted at 227–228 degrees centigrade (after recrystallization from isopropanol-ether).

*Analysis.*—Calculated for $C_{22}H_{32}N_2O_3 \cdot HCl$: N, 6.85. Found: 6.67.

*Example 34.—1-methyl - 1,4,5,6 - tetrahydro-2-pyrimidylmethyl alpha-cyclopentylphenylacetate hydrochloride*

A solution of 2.75 grams (0.015 mole) of 1-methyl-2-chloromethyl-1,4,5,6-tetrahydropyrimidine hydrochloride in 25 milliliters of isopropanol was neutralized with 8.5 milliliters of 1.77 N (0.015 mole) sodium methylate solution and filtered into a solution of 3.0 grams (0.015 mole) of alpha-cyclopentylphenylacetic acid in 50 milliliters of isopropanol. A trace of potassium iodide was added and the mixture was refluxed for 5.5 hours. Removal of the solvent yielded an oily residue which solidified when triturated with dry ether. The solid was washed well with 20 milliliters of isopropanol-ether solution and recrystallized from ethanol ether. A fraction (0.5 gram, 10 percent) melting at 179–181 degrees centigrade and analyzing correctly for the basic ester hydrochloride, 1-methyl-1,4,5,6-tetrahydro-2-pyrimidylmethyl alpha-cyclopentylphenylacetate hydrochloride was obtained; however, another fraction (0.3 gram) melting at 189–191 degrees centigrade and analyzing for the basic ester hydrochloride was also obtained. (Previous experiences with tetrahydropyrimidine type basic esters have shown that appreciable variations in melting points and decomposition points with small amount of impurities are not uncommon.)

Analysis.—Calculated for $C_{19}H_{26}N_2O_2 \cdot HCl$: N, 7.99. Found: N, 8.17.

Example 35.—1-methyl - 1,4,5,6 - tetrahydro-2-pyrimidylmethyl alpha-phenyl-2-thienylglycolate hydrochloride A solution of 1.4 grams (0.0077 mole) of 2-chloromethyl-1-methyl-1,4,5,6-tetrahydropyrimidine hydrochloride in 20 milliliters of isopropanol was neutralized with 4.35 milliliters (0.0077 mole) of 1.77 N methanolic sodium methylate and filtered into a solution of 1.8 grams (0.0077 mole) of alpha-thienylphenylglycolic acid in 20 milliliters of isopropanol. Potassium iodide (0.2 gram) was added and the solution was refluxed for six hours. The solution was treated with charcoal, filtered and cooled. The solid which separated was filtered off and recrystallized from isopropanol-ether. Yield, 0.9 gram of 1-methyl-1,4,5,6-tetrahydro-2-pyrimidylmethyl alpha-phenyl-2-thienylglycolate hydrochloride was a white crystalline solid, melting at 210–211 degrees centigrade, with decomposition.

Analysis.—Calculated for $C_{18}H_{20}N_2O_3S \cdot HCl$: N, 7.36. Found: N, 7.18.

Example 36. — 1-methyl-1,4,5,6-tetrahydro-2-pyrimidylmethyl alpha-cyclopentyl-2-thienylglycolate hydrochloride Four and four-tenths milliliters (0.0066 mole) of 0.015/10 cc. solution of 1-methyl-2-chloromethyl-1,4,5,6-tetrahydropyrimidine hydrochloride in isopropanol was neutralized with 3.7 milliliters of 1.77 N (0.0066 mole) of sodium methylate solution and filtered into a solution of 1.5 grams (0.0066 mole) of alpha-cyclopentyl-2-thienyglycolic acid in 50 milliliters of isopropanol. A trace of potassium iodide was added, and the mixture was refluxed for ten hours, the last half-hour with Nuchar. A solid was obtained by diluting the filtered solution with a small amount of ether. Recrystallization of the solid from isopropanol-methanol yielded 0.6 gram (24 percent) of 1 - methyl-1,4,5,6-tetrahydro-2-pyrimidylmethyl alpha-cyclopentyl-2-thienylglycolate hydrochloride as a white crystalline solid, melting and decomposing at 214–215 degrees centigrade.

Analysis:—Calculated for $C_{17}H_{24}N_2O_3S \cdot HCl$: N, 7.51. Found: N, 7.31.

Example 37. — 4-methyl-1,4,5,6-tetrahydro-2-pyrimidylmethyl alpha-bromo-alpha - cyclomohexylphenylacetate hydrochloride A mixture of 3 grams (0.0079 mole) of 4-methyl-1,4,5,6-tetrahydro-2-pyrimidylmethyl alpha - cyclohexylphenylglycolate hydrochloride and 75 milliliters of chloroform, which had been saturated previously at 20 degrees centigrade with hydrogen bromide, was heated at 50–60 degrees centigrade for 4.5 hours. The solid which remained after the solvent and excess hydrogen bromide had been removed by distillation was digested in 75 milliliters of boiling acetone, and the mixture was filtered. The solid weighed 2 grams and was unreacted starting material. The acetone filtrate was concentrated to an oil which was dissolved in isopropanol and the solution was diluted with ether. The solid which separated was isolated and recrystallized from an isopropanol-ether mixture. Yield, 0.55 gram (47 percent, based on the recovery of starting material) of 4-methyl-1,4,5,6-tetrahydro-2-pyrimidylmethyl alpha-bromo - alpha - cyclohexylphenylacetate hydrochloride was a white, crystalline solid, melting at 160–161 degrees centigrade.

Analysis:—Calculated for $C_{20}H_{27}BrN_2O_2 \cdot HCl$: N, 6.31 total halogen, 26.00. Found: N, 6.06 total halogen, 25.36.

Example 38.—1,4,5,6 - tetrahydro - 2 - pyrimidylmethyl alpha-bromodiphenylacetate hydrobromide A solution of 3.6 grams (0.01 mole) of 1,4,5,6-tetrahydro-2-pyrimidylmethyl benzilate hydrochloride in 50 milliliters of a 0.5 N chloroform solution of hydrogen bromide was allowed to remain at room temperature for seven days, after which the solvent was removed by vacuum distillation below 59 degrees centigrade. The oily residue was dissolved in 10 milliliters of isopropanol and the solution was diluted with ether to precipitate 3 grams (64 percent) of 1,4,5,6-tetrahydro-2-pyrimidylmethyl alpha-bromodiphenylacetate hydrobromide, a crystalline solid, melting at 147–148 degrees centigrade, after subsequent recrystallization from isopropanol-ether.

Analysis:—Calculated for $C_{19}N_{19}BrN_2O_2 \cdot HBr$: N, 5.99. Found: N, 6.09.

Example 39.—1,4,5,6 - tetrahydro - 2 - pyrimidylmethyl alpha-chloro-alpha-cyclohexylphenylacetate hydrochloride A mixture of 1 gram (0.0027 mole) of 1,4,5,6-tetrahydro-2-primidylmethyl alpha - cyclohexylphenylglycolate hydrochloride, 5 milliliters (0.069 mole) of thionyl chloride, and 1 drop of pyridine was heated at 50 degrees centigrade for two hours. The homogeneous yellow reaction mixture was vacuum distilled to remove the excess thionyl chloride, and the oily residue, which solidified, was dissolved in isopropanol. The solution was treated with decolorizing charcoal, filtered and concentrated to a volume of approximately 10 milliliters. The warm solution was diluted with ether and allowed to crystallize. The solid which separated was recrystallized from isopropanol-ether to obtain 0.5 gram (45 percent) of a white crystalline solid 1,4,5,6-tetrahydro-2-pyrimidylmethyl alpha-chloro - alpha - cyclohexylphenylacetate hydrochloride, melting at 168–169 degrees centigrade.

Analysis:—Calculated for $C_{19}H_{25}ClN_2O_2 \cdot HCl$: N, 7.27. Found: N, 7.19.

Example 40.—4,5 - dihydro - 2 - imidazolylmethyl alpha-bromodiphenylacetate hydrobromide A heterogeneous mixture of 5 grams (0.0145 mole) of 4,5-dihydro - 2 - imidazolylmethyl benzilate hydrochloride and 75 milliliters of a 0.5 N chloroform solution of hydrogen bromide was allowed to remain at room temperature for six days. The mixture was filtered to remove 2.4 grams of the unreacted benzilic ester, and the filtrate was vacuum-distilled to an orange-red oily residue. The oil was dissolved in acetone, the solution was filtered and diluted with ether to precipitate 2 grams (60 percent, based on the benzilic ester actually used) of a white, crystalline solid. Recrystallization of this solid from acetone-ether yielded 1.2 grams of pure 4,5-dihydro-2-imidazolylmethyl alpha-bromodiphenylacetate hydrobromide, melting at 148–149 degrees centigrade (decomposition).

Analysis:—Calculated for $C_{18}H_{17}BrN_2O_2 \cdot HBr$: N, 6.17. Found: N, 6.21.

Example 41.—1,4,5,6 - tetrahydro - 2 - pyrimidylmethyl alpha-bromo-alpha-cyclohexylphenylacetate hydrochloride A suspension of 7.3 grams (0.02 mole) of 1,4,5,6-tetrahydro - 2 - pyrimidyl alpha-cyclohexylphenylglycolate hydrochloride in 270 grams of chloroform, which had been saturated previously at 20 degrees centigrade with hydrogen bromide, was allowed to remain at room temperature for eleven days. During this period most of the solid dissolved. The mixture was filtered, and the clear amber filtrate was vacuum-distilled to remove the volatile materials. The oily residue was digested with 35 milliliters of boiling acetone whereupon most of the oil dissolved, and the remainder was converted into a crystalline solid. The hot mixture was filtered to remove 2.1 grams of a white crystalline solid; melting at 231–232 degrees centigrade (decomposition), after recrystallization from an alcohol-ether mixture. This solid was shown to be 1,4,5,6-tetrahydro-2-pyrimidylmethyl alpha - cyclohexylphenylglycolate hydrobromide by analysis and by mixed melting point determination with an authentic sample.

*Analysis.*—Calculated for $C_{19}H_{26}N_2O_3 \cdot HBr$: N, 6.81. Found: N, 6.77.

The acetone filtrate from which the above material was isolated was vacuum-distilled to remove the solvent. The amber oily residue was dissolved in isopropanol, the solution was decolorized with charcoal and filtered. The warm filtrate was diluted with ether, allowed to cool and the white platelets which separated were isolated, washed with an isopropanol-ether mixture and dried. Yield, 3.8 grams of 1,4,5,6-tetrahydro-2-pyrimidylmethyl alpha-bromo - alpha - cyclohexylphenylacetate hydrobromide, melting at 156–157 degrees centigrade.

*Analysis.*—Calculated for $C_{19}H_{25}BrN_2O_2 \cdot HBr$: C, 48.22; H, 5.54; N, 5.92; Br, 33.77. Found: C, 48.81; H, 5.55; N, 6.06; Br, 32.72

The identity of the compound was also established by its infra-red absorption spectrum.

*Example 42.—1,4,5,6-tetrahydro-2-pyrimidylmethyl alpha-(2-pentyl)-phenylglycolate hydrochloride*

A solution of 4.8 grams (0.024 mole) of 2-chloromethyl-1,4,5,6-tetrahydropyrimidine hydrochloride in 50 milliliters of isopropanol was neutralized with 5.3 milliliters of 4.56 N sodium methylate and filtered into a solution of 5.5 grams (0.024 mole) of alpha-(2-pentyl)-phenylglycolic acid in 150 milliliters of isopropanol. About 0.1 gram of powdered potassium iodide was added. The solution was refluxed for 5 hours, concentrated to 75 milliliters, and diluted with ether. The solid which separated was recrystallized from ethanol-ether to yield 0.4 gram (4.6 percent) of 1,4,5,6-tetrahydro-2-pyrimidyl-methyl alpha-(2-pentyl)-phenylglycolate hydrochloride, melting at 218–219 degrees centigrade.

*Analysis.*—Calculated for $C_{18}H_{26}N_2O_3 \cdot HCl$: N, 7.90. Found: N, 7.80.

*Example 43.—2-(1,4,5,6-tetrahydropyrimidyl)methyl 1-phenyl-1-hydroxycaprylate hydrochloride*

Following the procedure of Example 42, but using 2-chloromethyl-1,4,5,6-tetrahydropyrimidine hydrochloride and alpha-hydroxyphenylcaprylic acid, there was obtained colorless platelets of 2-(1,4,5,6-tetrahydropyrimidyl)methyl-1-phenyl-1-hydroxycaprylate hydrochloride, melting at 185–186 degrees centigrade.

*Analysis.*—Calculated for $C_{19}H_{29}ClN_2O_3$: N, 7.60. Found: N, 7.61.

*Example 44.—4,5,6,7-tetrahydro-2-(1,3-diazepinyl)methyl alpha-cyclopentylphenylglycolate hydrochloride*

A solution of 1.8 grams (0.01 mole) of 2-chloromethyl-4,5,6,7-tetrahydro-1,3-diazepine hydrochloride in 5 milliliters of methanol was neutralized with 4.5 milliliters of 2.2 N methanolic sodium methylate and added to a solution of 2.2 grams (0.01 mole) of alpha-cyclopentylphenylglycolic acid in 30 milliliters of isopropanol. The mixture was filtered, 0.2 grams of potassium iodide was added and the mixture was refluxed for 4 hours, after which it was filtered and cooled. The solid which separated was isolated and recrystallized from ethanol to obtain 0.65 gram of 4,5,6,7-tetrahydro-2-(1,3-diazepinyl)methyl alpha-cyclopentylphenylglycolate hydrochloride as pure white platelets, melting at 219–220 degrees centigrade.

*Analysis.*—Calculated for $C_{19}H_{26}N_2O_3 \cdot HCl$: N, 7.64. Found: N, 7.75.

The compounds of the present invention have indicated utility in preliminary pharmacological testing as spasmolytic agents. Employing the well-known Magnus test for spasmolytic potency, the materials of the present invention unexpectedly have utility against the action of both acetyl choline and barium chloride. Certain of the compounds have also indicated utility as local anesthetics in preliminary pharmacological testing.

Pharmacologic testing of certain of the compounds of the present invention, e.g., those of Example 9, has indicated that they have a high gastric antisecretory activity on parenteral, oral and intra-duodenal administration with a minimum of the normal side effects usually associated with this antispasmodic type of material. For example, the mydriatic potency of the hydrochloride salt of Example 9 is forty times less than that of atropine and Pro-Banthine, sixteen times less than Banthine and 160 times less than Pamine. A low antisialogogue effect was indicated by testing against Pilocarpine stimulated salivation in rabbits. Further, the vagolytic effect on the heart was considerably less than that of Atropine. This pharmacological testing indicates that certain of the compounds of this invention also have a high degree of utility for the treatment of ulcers of the gastro-intestinal tract.

Other of the compounds of the present invention, particularly those wherein the alcohol moiety is a loweralkyl substituted dihydroimidazolyl or tetrahydropyrimidyl moiety in pharmacologic testing by both the Magnus tests and the Shay rat tests indicated outstanding activity, giving better results than shown by some commercially accepted drugs. Apparently the introduction of the lower-alkyl substituted dihydroimidazolyl or tetrahydropyrimidyl moiety is sufficient to modify the pharmacological characteristics very advantageously. In view of these facts, these compounds have utility as both antispasmodic and anti-secretory agents.

This application is a continuation-in-part of our copending prior filed applications all of which are now abandoned:

Serial 451,050 filed August 19, 1954, entitled "Heterocyclic Esters"; and, Serial 503,784 filed April 25, 1955, entitled, "Tetrahydropyrimidyl Ester" (which is itself a continuation-in-part of Serial 451,050); and, also Serial 529,904 filed August 22, 1955, entitled, "Lower-Alkyl Substituted Amino Esters."

It is to be understood that our invention is not to be limited to the exact processes and compounds shown and described, as obvious modifications and equivalents will be apparent to one skilled in the art, and our invention is therefore to be limited only by the scope of the appended claims.

We claim:

1. A compound selected from the group consisting of: (A) esters having the formula

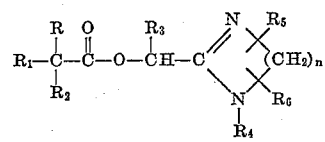

wherein R is selected from the group consisting of phenyl and 2-thienyl; $R_1$ is selected from the group consisting of hydrogen, hydroxyl and halogen; $R_2$ is selected from the group consisting of phenyl, lower alkyl, cyclohexyl and cyclopentyl; $R_3$ is selected from the group consisting of hydrogen and lower alkyl; $R_4$ is selected from the group consisting of hydrogen and lower alkyl; $R_5$ and $R_6$ are each selected from the group consisting of hydrogen and methyl; $n$ is selected from the group consisting of the integers 2, 3 and 4; and (B) stable, non-toxic acid addition salts thereof.

2. 1,5,5 - trimethyl - 1,4,5,6 - tetrahydro - 2 - pyrimidylmethyl - alpha - cyclohexylphenylglycolate hydrochloride.

3. 1,4,5,6-tetrahydro-2-pyrimidyl-methyl alpha-cyclohexylphenylglycolate hydrochloride.

4. 1,4 - dimethyl - 1,4,5,6 - tetrahydro - 2 - pyrimidylmethyl-alpha-cyclohexylphenylglycolate hydrobromide.

5. 4 - methyl - 1,4,5,6 - tetrahydro - 2 - pyrimidylmethyl-alpha-cyclohexylphenylacetate hydrochloride.

6. 1-ethyl-1,4,5,6-tetrahydro-2-pyrimidylmethyl-alpha-cyclopentylphenylglycolate hydrochloride.

7. 1-methyl-1,4,5,6-tetrahydro-2-pyrimidylmethyl alpha-cyclopentyl-alpha-phenylglycolate hydrochloride.

8. 1-methyl-1,4,5,6-tetrahydro-2-pyrimidylmethyl alpha-cyclohexylphenylglycolate hydrochloride.

9. 1-methyl-1,4,5,6-tetrahydro-2-pyrimidylmethyl alpha-cyclopentyl-2-thienylglycolate hydrochloride.

10. 1,4-dimethyl-1,4,5,6-tetrahydro-2-pyrimidylmethyl alpha-cyclopentylphenylglycolate hydrochloride.

11. A process for preparing esters having the formula:

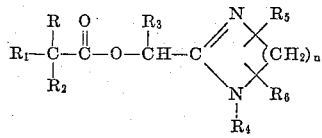

wherein

R is selected from the group consisting of phenyl and 2-thienyl;

$R_1$ is selected from the group consisting of hydrogen, hydroxyl and halogen;

$R_2$ is selected from the group consisting of phenyl lower alkyl, cyclohexyl and cyclopentyl;

$R_3$ is selected from the group consisting of hydrogen and lower alkyl;

$R_4$ is selected from the group consisting of hydrogen and lower alkyl;

$R_5$ and $R_6$ are each selected from the group consisting of hydrogen and methyl;

$n$ is selected from the group consisting of integers 2, 3 and 4, which comprises: reacting an acid having the formula:

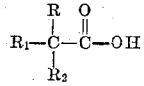

wherein R, $R_1$ and $R_2$ have the above values, with a heterocyclic material having the formula:

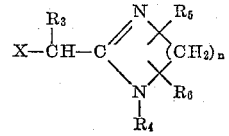

wherein $R_3$, $R_4$, $R_5$, $R_6$ and $n$ have the above values and wherein X is a halogen selected from the group consisting of chlorine, bromine and iodine, and, separating a compound having the above ester formula from the reaction mixture.

12. A process which comprises: mixing in the presence of a solvent, alpha-cyclohexylphenylglycolic acid and 2-chloromethyl-1,4,5,6-tetrahydropyrimidine and separating the resulting 1,4,5,6-tetrahydro-2-pyrimidyl-methyl alpho-cyclohexylphenylglycolate hydrochloride from the reaction mixture.

References Cited in the file of this patent

UNITED STATES PATENTS 2,695,301   Blicke _____ Nov. 23, 1954
2,735,847   Blicke _____ Feb. 21, 1956

OTHER REFERENCES

Karrer: Organic Chem., Elsevier Pub. Co., New York, N.Y., 1950, p. 74.

UNITED STATES PATENT OFFICE

CERTIFICATE OF CORRECTION

Patent No. 2,953,565                            September 20, 1960

John A. Faust et al.

It is hereby certified that error appears in the printed specification of the above numbered patent requiring correction and that the said Letters Patent should read as corrected below.

Column 6, line 52, for "$C_4H_{12}N_2.2CHCl$" read -- $C_4H_{12}N_2.2HCl$ --; Column 12, line 49, for "0.5" read -- 0-5 --; column 24, line 61, for "hydrochloride" read -- hydrobromide --.

Signed and sealed this 25th day of April 1961.

(SEAL)
Attest:
ERNEST W. SWIDER
Attesting Officer

DAVID L. LADD
Commissioner of Patents